(12) United States Patent
Sutko et al.

(10) Patent No.: US 7,796,314 B2
(45) Date of Patent: Sep. 14, 2010

(54) METHOD AND APPARATUS FOR TWO-AXIS, HIGH-SPEED BEAM STEERING

(75) Inventors: John L. Sutko, Reno, NV (US); Nelson George Publicover, Reno, NV (US)

(73) Assignee: Board of Regents of the Nevada System of Higher Education, Reno, NV (US)

( * ) Notice: Subject to any disclaimer, the term of this patent is extended or adjusted under 35 U.S.C. 154(b) by 670 days.

(21) Appl. No.: 10/592,035

(22) PCT Filed: Mar. 8, 2005

(86) PCT No.: PCT/US2005/007759

§ 371 (c)(1),
(2), (4) Date: Sep. 13, 2007

(87) PCT Pub. No.: WO2005/086858

PCT Pub. Date: Sep. 22, 2005

(65) Prior Publication Data

US 2008/0123169 A1     May 29, 2008

Related U.S. Application Data

(60) Provisional application No. 60/551,655, filed on Mar. 8, 2004.

(51) Int. Cl.
*G02B 26/08*    (2006.01)
(52) U.S. Cl. ............ 359/198.1; 359/199.1; 359/199.4; 359/212.2; 359/214.1; 359/224.1
(58) Field of Classification Search ... 359/198.1–202.1, 359/213.1–215.1, 223.1, 224.2
See application file for complete search history.

(56) References Cited

U.S. PATENT DOCUMENTS

| | | | |
|---|---|---|---|
| 3,013,457 A | 12/1961 | Le Blond et al. | |
| 4,664,487 A | 5/1987 | Tam | |
| 5,283,433 A | 2/1994 | Tsien | |
| 5,408,253 A | 4/1995 | Iddan | |
| 5,865,978 A | 2/1999 | Cohen | |

(Continued)

OTHER PUBLICATIONS

Peng, S. et al., "Diffusion of Single Cardiac Ryanodine Receptors in Lipid Bilayers is Decreased by Annexin 12," Biophysical Journal, vol. 86 (Jan. 2004), pp. 145-151.

(Continued)

*Primary Examiner*—James Phan
(74) *Attorney, Agent, or Firm*—University of Nevada, Reno, Technology Transfer Office; Ryan A. Heck

(57) ABSTRACT

Dual axis, beam-steering devices are disclosed. An exemplary device includes a support platform having a top surface. A reflective surface is coupled to the top surface of the support platform. First and second galvanometers are coupled via respective linkages to the support platform such that the first galvanometer rotates the support platform about a first rotational axis, and the second galvanometer rotates the support platform about a second rotational axis that is orthogonal to the first rotational axis. The support platform can be simultaneously rotated with respect to both the first rotational axis and the second rotational axis to steer a beam of electromagnetic energy (e.g. light beam) reflected by the reflective surface.

21 Claims, 8 Drawing Sheets

U.S. PATENT DOCUMENTS

| | | | | |
|---|---|---|---|---|
| 5,912,608 A | * | 6/1999 | Asada | 335/222 |
| 6,057,867 A | | 5/2000 | Chan et al. | |
| 6,271,916 B1 | | 8/2001 | Marxer et al. | |
| 6,606,153 B2 | | 8/2003 | Marxer et al. | |
| 6,844,952 B2 | * | 1/2005 | Dalziel | 359/224.1 |
| 7,009,172 B2 | | 3/2006 | Publicover et al. | |
| 2001/0047682 A1 | | 12/2001 | Samsavar et al. | |
| 2003/0089162 A1 | | 5/2003 | Samsavar et al. | |

OTHER PUBLICATIONS

Peng, S. et al., Imaging Single Cardiac Ryanodine Receptor Ca2+ Fluxes in Lipid Bilayers, Biophysical Journal, vol. 86 (Jan. 2004), pp. 134-144.

*International Search Report* for related application PCT/US05/07759, ISA/US, 5 pp., mailed Feb. 22, 2007.

\* cited by examiner

METHOD AND APPARATUS FOR TWO-AXIS, HIGH-SPEED BEAM STEERING

CROSS REFERENCE TO RELATED APPLICATIONS

This is the National Stage of International Application No. PCT/US2005/007759, filed Mar. 8, 2005, which claims the benefit of U.S. Provisional Patent Application No. 60/551,655, filed Mar. 8, 2004, all of which are incorporated herein by reference.

FIELD

This disclosure relates to, inter alia, light-beam steering, in which light from an illumination source is directed at high rates to a destination. Particular applications include laser-scanning confocal microscopy, optical scanning, optical particle tracking, and light-projection systems.

BACKGROUND

A number of emerging technologies are incorporating photonics. Among these are optical imaging, telecommunications, entertainment devices, image-projection systems, medical diagnosis and treatment, photolithography, materials inspection, biosensors, and surveillance. Applications of these technologies share a requirement for the rapid and accurate scanning of a laser beam either to image an object or to project light onto a surface.

When a dynamic system or process is imaged optically, the rate of image acquisition (i.e., number of image frames acquired per unit time) is an important consideration. A "dynamic system" may be, for example, a stationary object that changes over time, a specimen that moves spatially within a field-of-view, or both processes occurring simultaneously. Many important processes occur within time domains that are less than one second. In such cases, it is frequently desirable to acquire images in at least two spatial dimensions as rapidly as is consistent with the sampling of sufficient numbers of photons to form an acceptable image.

Many imaging applications of dynamic systems and processes also require optimal spatial resolution. Laser-scanning confocal microscopy is commonly used to improve this parameter, particularly in the z-dimension that typically extends parallel to the optical axis. In a scanning-microscope system, such as a laser-scanning confocal microscope system, the illuminating light or specimen must be moved relative to the other, or moved relative to one another. This can be accomplished by moving the specimen while keeping the illuminating light in a fixed position, by moving the illuminating light across the specimen while the latter is kept stationary, or by simultaneously moving both the illumination light and the specimen.

Certain optical advantages can be achieved by keeping the illumination light stationary and moving the specimen (for example, see U.S. Pat. No. 3,013,457, incorporated herein by reference, which provides an original description of a confocal optical system). However, this approach involves accelerating, moving, and decelerating the relatively large mass of a microscope stage or other type of inspection platform, which typically prevents scanning at rates greater than a few frames per second. In addition, this approach restricts or prevents the use of immersion objectives, in which an intermediate layer of an appropriate medium, such as oil, water, or glycerin, is maintained between the objective and the specimen.

Because of such limitations, it is common to scan the beam of illumination light (typically a laser beam) over the specimen in a two-dimensional raster manner (involving one-dimensional lines repeated with intervening steps in the orthogonal dimension) in the majority of modern scanning microscopes. The laser beam is scanned by a beam-steering device comprising multiple mirrors mounted on respective devices capable of controlled motion, such as galvanometers or piezoelectric elements, or using micro-mirrors mounted on microelectromechanical systems (MEMS). Another beam-steering approach utilizes stationary devices, such as acousto-optical beam deflectors (AODs) that exploit changes in refractive index of a material to alter the path of the light beam. However, each of these beam-steering devices is constrained by limitations related to their maximum achievable scan rates and/or optical properties.

Galvanometers are currently the beam-steering device most commonly employed in scanning optical systems. Respective mirrors, mounted on two independent galvanometers, are used to achieve beam steering in two (x and y) spatial dimensions. Closed-loop galvanometer pairs have been used most frequently; these devices exploit the ability to modulate and control the position of each mirror as it is moved back and forth in a single dimension in an accurate manner that is inherent to this type of device. A closed-loop galvanometer typically also has position-feedback signals that can be used to verify the position of the mirror at a given point in time. However, the frequency response of this type of galvanometer is limited (generally to less than 1 kHz) by several factors, and this limitation restricts the galvanometer's image-acquisition rate to typically less than video rates. These factors include the extent of mechanical movement of the mirror and the size (and hence the mass) of the reflective surface required. Ultimately, the time required to dissipate heat resulting from the electromagnetic forces used to drive movements of the mirror becomes limiting. All of these factors are inversely related to the frequency response of the galvanometer system.

In another approach, resonant galvanometers, which have lower-friction movements, can be driven at frequencies of up to 8 kHz. Such galvanometers have been used to deflect a laser beam in one spatial dimension. A slower (30-60 Hz) closed-loop galvanometer is used to deflect the beam in the second spatial dimension. Using this combination of galvanometers, acquisition rates of 30-60 frames/sec have been achieved for two-dimensional images. For examples, see Tsien and Bacskai, "Video-Rate Confocal Microscopy," in Pawley (ed.), *Handbook of Biological Confocal Microscopy,* 2nd ed., chapter 29, Plenum Press, New York, 1995, and U.S. Pat. No. 5,283,433, incorporated herein by reference.

Since prior-art beam-steering systems utilize two mirrors to achieve both x- and y-direction scanning, these systems cannot place the axis of a primary deflection surface in a telecentric conjugate image plane. The need to utilize physically separate mirrors in galvanometer-based systems to steer the laser beam in two spatial dimensions in galvanometer-based systems imposes optical limitations (e.g., see the discussion by Stelzer, "The Intermediate Optical System of Laser-Scanning Confocal Microscopes," in Pawley (ed.), *Handbook of Biological Confocal Microscopy,* 2nd ed., chapter 9, Plenum Press, New York, 1995). In imaging situations, in which laser-scanning confocal microscope systems utilizing single-photon excitation are used, it is necessary to sense light originating in the sample, such as fluorescent or reflected light, using a fixed-spot detector such as a photomultiplier tube or photodiode. To focus light from the sample onto a fixed point, the light must be de-scanned by the beam-steering device. Such de-scanning is optimal whenever the axis of the primary deflecting surface is placed at a telecentric conjugate image plane. However, such placement is not possible if, as in the prior art, separate reflective surfaces are used to deflect the beam in each of the two respective dimensions. Placement of the reflective surfaces in an axial parallel arrangement reduces, but does not eliminate, the associated optical distortion.

Another conventional approach to rapid, single-axis laser-beam deflection involves the use of an acousto-optical beam deflector (AOD). As noted previously, this device exploits induced changes in refractive index of a material to deflect the beam rapidly (with a 1-5 kHz frequency range) in one spatial dimension (e.g., x-dimension). As is the case for the resonant galvanometer, a second device is required to deflect the beam in the second spatial dimension (e.g., y-dimension). In addition, although scanning systems utilizing AOD devices have achieved high scan rates over a somewhat limited range of deflection angles, use of the AOD introduces optical disadvantages, particularly when used with laser-scanning confocal microscope systems. These disadvantages include reduced transmission efficiency, wavelength-dependent angles of deflection, and the inability of light emitted from the sample at wavelengths greater than that shone on the sample (e.g., fluorescence) to be de-scanned by the AOD device along the optical path used by the illuminating light. Additional optics are required to reduce the impact of these disadvantages on spatial resolution, which decreases the optical efficiency that can be achieved.

High-rate (1-10 kHz frequencies), 2-axis beam deflection has been achieved using an electrostatically actuated MEMS micro-mirror beam-steering device. However, the low level of torque produced by these devices limits the size of the reflective surface to typically <1 mm. Such a small clear aperture limits the achievable spatial resolution to much less than that of confocal systems currently available commercially and places important limitations on the properties of the intermediate optical system that can be used. Increasing the size of the mirror results in a marked reduction in scan frequency and an increase in the dynamic deformations of reflective surfaces. These deformations diminish the quality of the reflected light and, thus, the optical quality of acquired images.

Thus, there is currently a need for a two-axis beam-steering device having a single, large reflective surface.

SUMMARY OF THE INVENTION

Among various aspects disclosed herein is one aspect directed to two-axis beam-steering devices having large clear apertures. The beam-steering devices can deflect laser beams or other illumination beams in two dimensions with a frequency response in the kHz range. Micro-machined and/or semiconductor structures can be used to form a reflector platform hybridized with closed-loop galvanometers to achieve rapid beam-steering movements. The beam-steering devices advantageously permit the use of galvanometer actuators that have suitable torque-generating capabilities to drive a single reflective surface in two spatial axes (e.g., x- and y-axes). Galvanometers are particularly well suited for being driven by amplitude-modulated sine waves employed as mirror-position command signals, as described in U.S. Pat. No. 7,009,172 to Applicants, issued Mar. 7, 2006, and incorporated herein by reference in its entirety, to extend the achievable frequency ranges. In addition, the use of a single reflective surface operating in a dual-axis mode optimizes the achievable spatial resolution. The devices can be configured to generate dual-axis position-feedback signals that are usable for monitoring and further increasing the accuracy of beam-steering.

According to another aspect, these beam-steering devices are incorporated into a laser-scanning confocal microscope system (LSCMS), as an exemplary system.

DETAILED DESCRIPTION

A representative embodiment of a two-axis, beam-steering device desirably has the following characteristics and properties: (a) comprises a reflective element (e.g., a mirror) having a highly reflective surface (produced, for example, using metal and/or dielectric coatings); (b) exhibits minimal spatial deformation either under static conditions or as a result of dynamic movements; and (c) driven by at least two galvanometer actuators each having a rotational axis; and (d) the rotational axes are substantially orthogonal to each other. Desirable (but not required) performance characteristics include: (1) deflects a beam of incident electromagnetic radiation over a total angle of at least 4° (mechanical); (2) deflects the beam at a frequency of >1.5 kHz; (3) the reflective element has a width of at least approximately 3 mm and a high reflective-surface fill factor (desirably close or equal to 100%); and (4) the galvanometers are drivable by any of various types of command signals, including (but not limited to) signals used for raster scanning and signals comprising amplitude-modulated sine or modified sine-wave functions. The representative embodiments described below meet or exceed these criteria.

According to various embodiments, the torque required to move a reflective element having significant mass, especially a reflective element mounted to a support platform or the like, through a significant mechanical angle (e.g., at least 4°) is achieved using at least two closed-loop galvanometers. An example of a suitable galvanometer is Model 6215 commercially available from Cambridge Technology (Cambridge, Mass.). The galvanometers are driven by appropriate driving and control circuitry, according to the manufacturer's specifications and requirements. Since galvanometers tend to generate heat during operation, it is desirable to cool them at least passively and more desirably actively. With appropriate modifications to the electronic control circuitry used to drive the galvanometers, active cooling of the galvanometers to increase the rate of thermal transfer from the galvanometers during use, and use of "intelligent control" non-raster command signals, the frequency response of the galvanometers can be extended to 5 kHz and higher.

Figure 1:
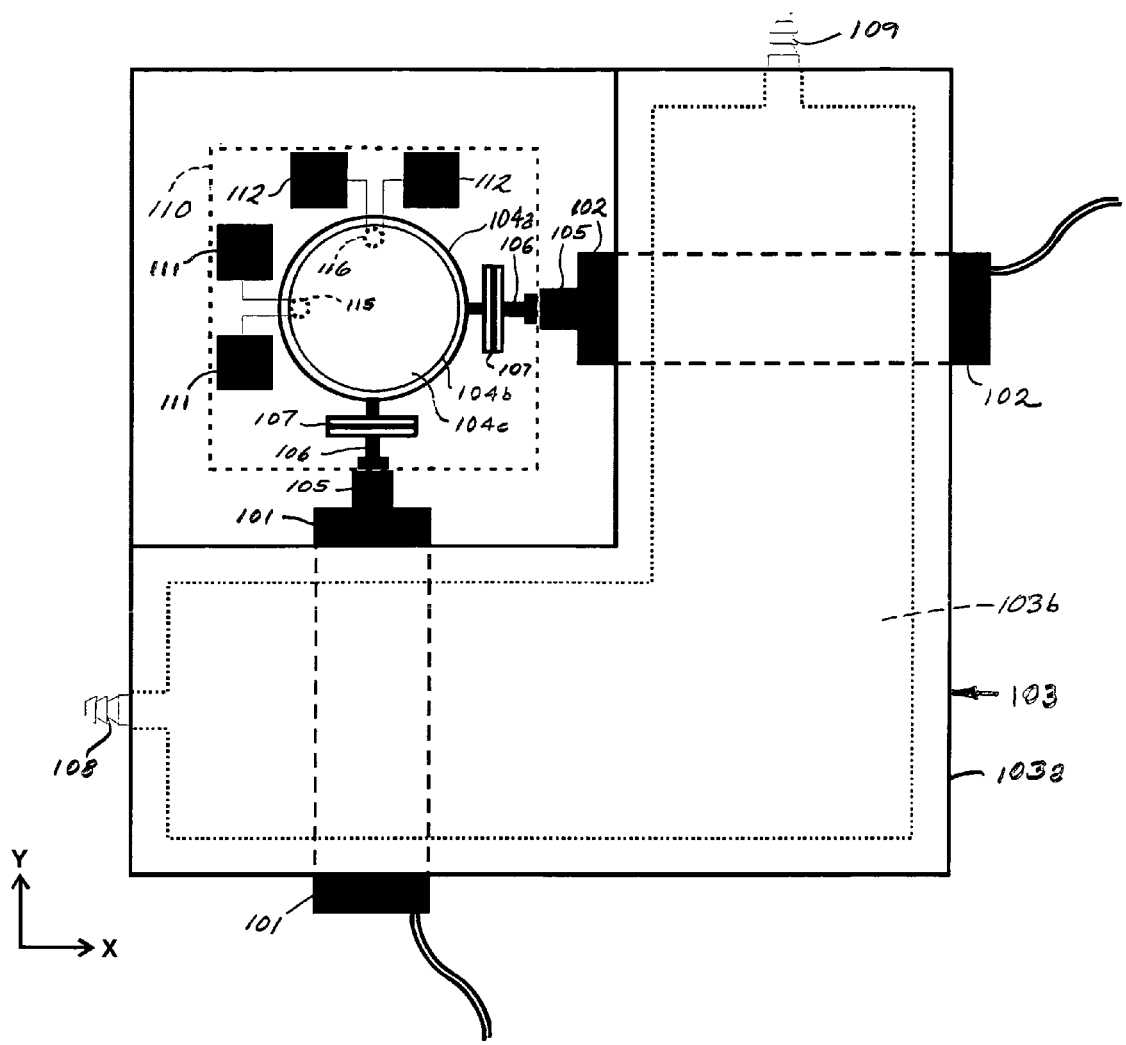
FIG. 1 is a plan view of an embodiment of a beam-steering device comprising two galvanometer actuators coupled to a single reflective element (e.g., mirror) and including an optical-position-feedback system in x- and y-axes located under the reflective element.

A first representative embodiment of a beam-steering device is shown in FIG. 1, comprising two galvanometers 101, 102 coupled to a support platform 104a. The galvanometers 101, 102 are situated orthogonally to one another. Each galvanometer 101, 102 comprises a respective central shaft 105. As the shafts 105 are rotated, energy is transmitted to the support platform 104. Operation of the galvanometers 101, 102 generates heat that can be rapidly conducted away from them in an active manner using a liquid-cooled heat sink 103. The heat sink 103 comprises a block 103a that defines a chamber 103b and includes an inlet 108 for conducting cooling liquid into the chamber and an outlet 10, and an outlet 109 for conducting coolant liquid from the chamber to an external temperature-controlled coolant circulator (not shown). The housing of each galvanometer 101, 102 is situated in or at least is thermally coupled to the chamber 103b so that, as the coolant liquid (e.g., water or other suitable liquid) flows through the chamber 103b, the liquid draws heat from the galvanometers 101, 102. The external temperature-controlled coolant circulator cools the liquid to the desired temperature and returns the liquid to the chamber 103b desirably continuously during operation of the galvanometers. For efficient operation, the block 103a can be made of aluminum alloy or other appropriate material having a suitable thermal-transfer coefficient. The block 103a can serve both to dissipate heat from the structure and to provide structural support for the galvanometers and other components of the device.

A reflective element 104b (e.g., a mirror) is attached to the support platform 104a. The reflective element 104b has an obverse reflective surface 104c and a reverse surface (facing the support platform 104a), and can have any of various profiles (e.g., round or square). The reflective element 104b is mounted (via its reverse surface) to the support platform 104a. The reflective element 104b need not be the same size or the same shape as the support platform 104a. The center of the reflective surface 104c desirably is situated substantially at the center of the support platform 104a.

The first galvanometer 101 rotates the support platform 104a (and hence the attached reflective element 104b) about the x-axis as a light beam is incident on the reflective surface 104c (desirably at the center of the reflective surface). This rotation of the support platform 104a causes the reflective element 104b to "steer" (by reflection) the incident beam in the x-direction. The second galvanometer 102 rotates the support platform 104a (and hence the attached reflective element 104b) about the y-axis as a light beam is incident on the reflective surface 104c (desirably at the center of the reflective surface). This rotation of the support platform 104a causes the reflective element 104b to steer (by reflection) the beam in the y-direction. The combined movements provided by both galvanometers 101, 102 produce a combined tip-tilt motion of the support platform 104a (and reflective element) that causes the reflective element 104b to deflect the beam simultaneously in both the x- and y-axes.

The respective shaft 105 of each galvanometer 101, 102 extends along the respective tilt axis and is attached via a respective linkage 106 to the support platform 104. Each linkage 106 has high stiffness (and thus is substantially non-compliant) with respect to the torque applied to the linkage by the respective shaft 105 in the direction of rotation of the shaft about the respective axis, but has significant compliance in a direction that is orthogonal to the plane of the page. Thus, the linkages 106 permit movements of the distal portions of the shafts 105 in the orthogonal axis (i.e., in and out of the plane of the page of FIG. 1). These movements require that the shafts 105 be capable of making small changes in axial length, which are achieved by including one or more respective spring mechanisms 107 (called "flexures" herein) on each shaft between the linkage 106 and the distal end of the shaft. The distal end of each shaft 105 is coupled to the support platform 104a so as to cause movement of the support platform corresponding to respective rotational motions of the shafts.

The support platform 104a can be made of any suitable rigid material, including any of various metals, silicon, ceramic, glass, polymer, and the like. The support platform 104a need not be separate from the reflective element 104b, wherein the reflective element is mounted to the support platform. Alternatively, the reflective surface 104c can be formed directly on the surface of the support platform 104. In addition, the support platform 104a can be contiguous with the linkages 106.

As noted above, a beam of light is incident on the reflective element 104b from a direction such as from above the plane of the page of FIG. 1. As the galvanometers 101, 102 impart rotational motions to the shafts 105, corresponding motions are imparted to the reflective element 104b, which causes deflection of the beam. The actual position of the deflected beam in two-dimensional space can be determined from reflector-position feedback signals. During imaging applications, these signals can be recorded concomitantly with intensity values obtained for light originating from the sample that is being illuminated by the deflected beam.

The reflector-position feedback signals can be generated in several ways. For example, the signals can be produced by monitoring galvanometer-shaft positions. Many types of galvanometers are equipped with shaft-position feedback sensors that provide such signals. A more accurate feedback signal (i.e., a signal that more closely corresponds to the actual direction of beam deflection from the reflective element 104b) can be produced by optically detecting the position of light that has been reflected from the reflective surface 104c and correlating the light-position data with position of the reflective element 104b. Alternatively, accurate feedback signals can be obtained by making capacitive measurements between a fixed platform 110 (or analogous structure; shown in phantom outline and removed to reveal underlying structure) and the reflective element 104b mounted on the support platform 104a. The latter configuration is illustrated schematically in FIG. 1, in which the embodiment includes sensing elements 115 for sensing the x-position of the reflective element 104b and sensing elements 116 for sensing the y-position of the reflective element. In this embodiment the sensing elements 115, 116 are located beneath (as viewed in the figure) the support platform 104a.

Figure 2:
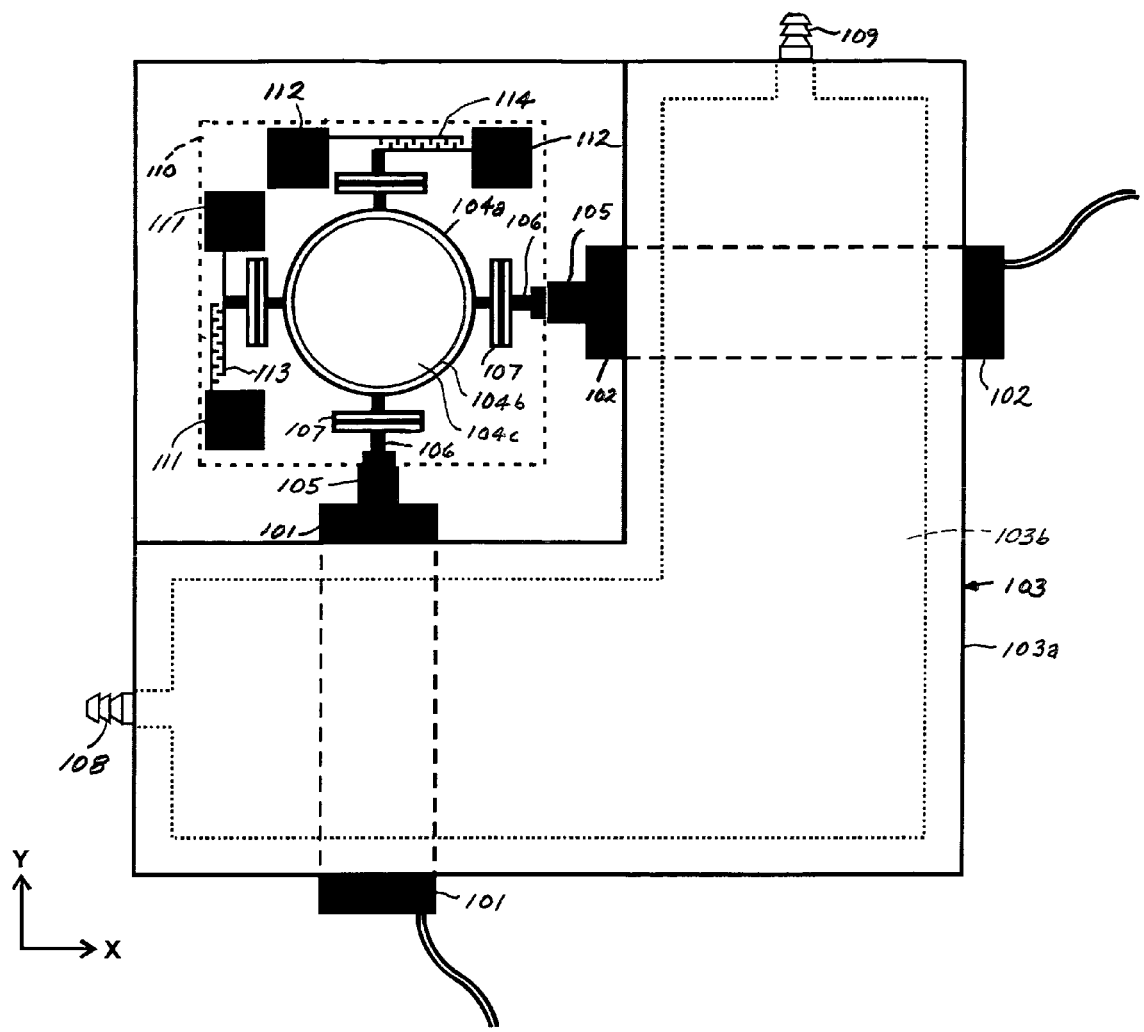
FIG. 2 is a plan view of an embodiment of a beam-steering device comprising two galvanometer actuators coupled to a single mirror and including capacitive-feedback devices for controlling motion of the mirror in x- and y-axes.

Yet another alternative position-sensing technique that provides feed-back data involves measurement of capacitive changes between electrostatically-charged silicon comb-finger structures (not shown) attached to the support platform 104a and accompanying motions of the platform. This position-sensing technique has been used by Milanovic et al., "High-Aspect-Ratio Two-Axis Scanners in SOI," 16th IEEE International Microelectromechanical Systems Conference, pp. 255-258, (2003), and is illustrated in FIG. 2, in which the support platform 104a and fixed platform 110 are made of silicon or other semiconductor material on which respective pairs of interdigitated silicon comb-fingers are formed for sensing motions in the x-direction (comb-fingers 113) and for sensing motions in the y-direction (comb-fingers 114) of the support platform 104a. As the support platform 104a undergoes tilts in the x- and y-directions, corresponding capacitance changes occur between the comb-fingers 113, 114, respectively. The magnitude of the capacitance change is proportional to the corresponding tip-angle of the support platform 104a.

In each of the position-sensing feedback schemes described above, electrical signals pertaining to the position of the support platform 104a are conducted or otherwise transmitted to external circuitry (e.g., a controller) via bond-pads 111 (or analogous structures) for x-direction sensing and bond-pads 112 (or analogous structures) for y-direction sensing. A controller (not shown) is advantageous because it can perform data analysis and processing of data contained in the signals produced by the sensors. This processing desirably yields real-time return-control signals to the galvanometers so that the angles of tilt of the reflective element about the two rotational axes and the frequency of tilt are as desired.

For motions of the support platform 104a in the x- and y-directions, it may be necessary or desirable to generate more torque than can be supplied by a single galvanometer in each respective direction, or it may be necessary or desirable to increase the frequency response of the beam-steering devices further. To such end, at least one respective additional galvanometer can be added for augmenting motions in each direction. An example of this configuration is shown in FIG. 3, in which the device comprises two opposing galvanometers along the same rotational axis for each direction of motion. Specifically, the galvanometers 201, 205 provide tilt motions about the x-axis, and the galvanometers 202, 204 provide tilt motions about the y-axis. Note that the galvanometers of each pair are located on opposing sides of the reflective element 104b, and that the respective axes $A_1$, $A_2$ of the galvanometers 201, 205 and 202, 204 intersect each other beneath the center of the reflective element 104b. Use of two respective galvanometers for motion in each of the x- and y-directions effectively doubles the torque applied to the support platform 104a. Also, placing the galvanometers of each pair in an opposing manner as shown stabilizes the position of the support platform 104a and reflective element 104b by generating symmetrical loads to the support platform. To achieve coordinated motion of the galvanometers of each pair, the opposing galvanometers 201, 205 and 202, 204 are wired oppositely (i.e., the + and − leads are reversed). Consequently, the galvanometers of each pair receive the same applied voltage but the shafts of each pair rotate in opposite directions (clockwise versus counter-clockwise) on the respective axis (i.e., galvanometer 202 is wired oppositely of galvanometer 204 for motions about the x-axis, and galvanometer 201 is wired oppositely of galvanometer 205 for motions about the y-axis).

Use of pairs of galvanometers can require reconfiguring the cooling block 203 to extend to each of the galvanometers 201, 205 and 202, 204, as shown.

Figure 3A:
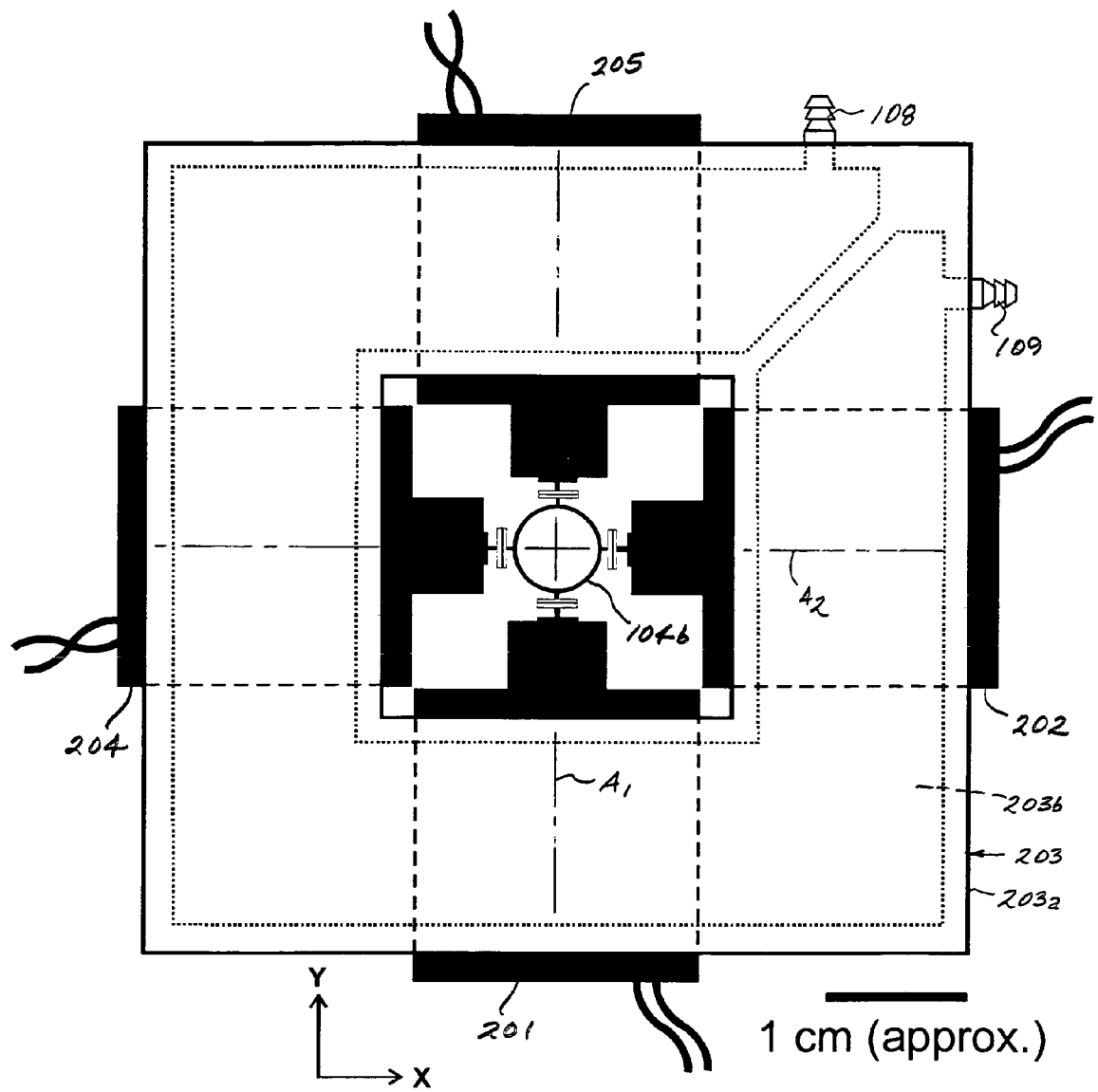
FIG. 3(A) is a plan view of an embodiment of a beam-steering device comprising four galvanometer actuators coupled to a single mirror.
Figure 3B:
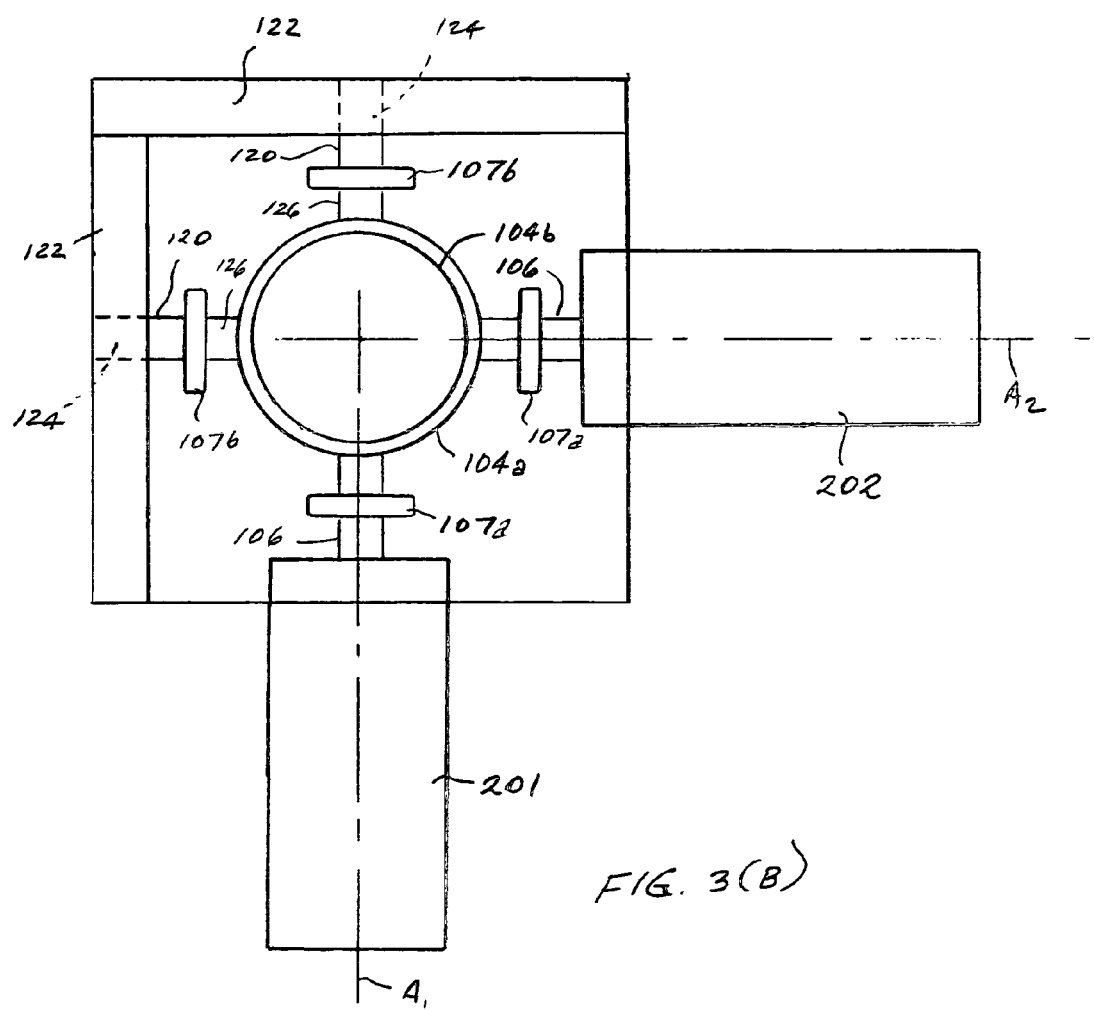
FIG. 3(B) is a plan view of an embodiment of a beam-steering device comprising two galvanometer actuators with opposing linkages on opposite sides of the mirror.

Use of multiple respective galvanometers for motions in each of the x- and y-directions can be applied to any of various embodiments of beam-steering devices. However, use of only one respective galvanometer for each motion is a lower-cost option if a maximal frequency response or maximal torque is not necessary for a particular application. In certain configurations comprising a total of only two galvanometers (one for x-direction motion and one for y-direction motion), it is advantageous to stabilize, along the respective tilt axis, at least one of the sides of the support platform or reflective element opposite the respective galvanometer. An embodiment of this configuration is shown in FIG. 3(B), which depicts two galvanometers 201, 202, the support platform 104a, the mirror 104b, and linkages 107a between the galvanometers and the support platform 104a. On opposite sides of the platform 104a from the galvanometers are second linkages 126, flexures 107b, and shafts 120. The shafts 120 are journaled in respective bearings 124 in respective side walls 122 (or analogous structures). Each second linkage 126 desirably is identical to the respective opposing linkage 106 on the galvanometer side and is coupled along the respective axis $A_1$, $A_2$ to the support platform 104a or reflective element 104b. Each second linkage 126 is passive and rotates freely (with or without bearings 124) as required to stabilize the non-galvanometer side(s) of the support platform 104a.

Figure 4A:
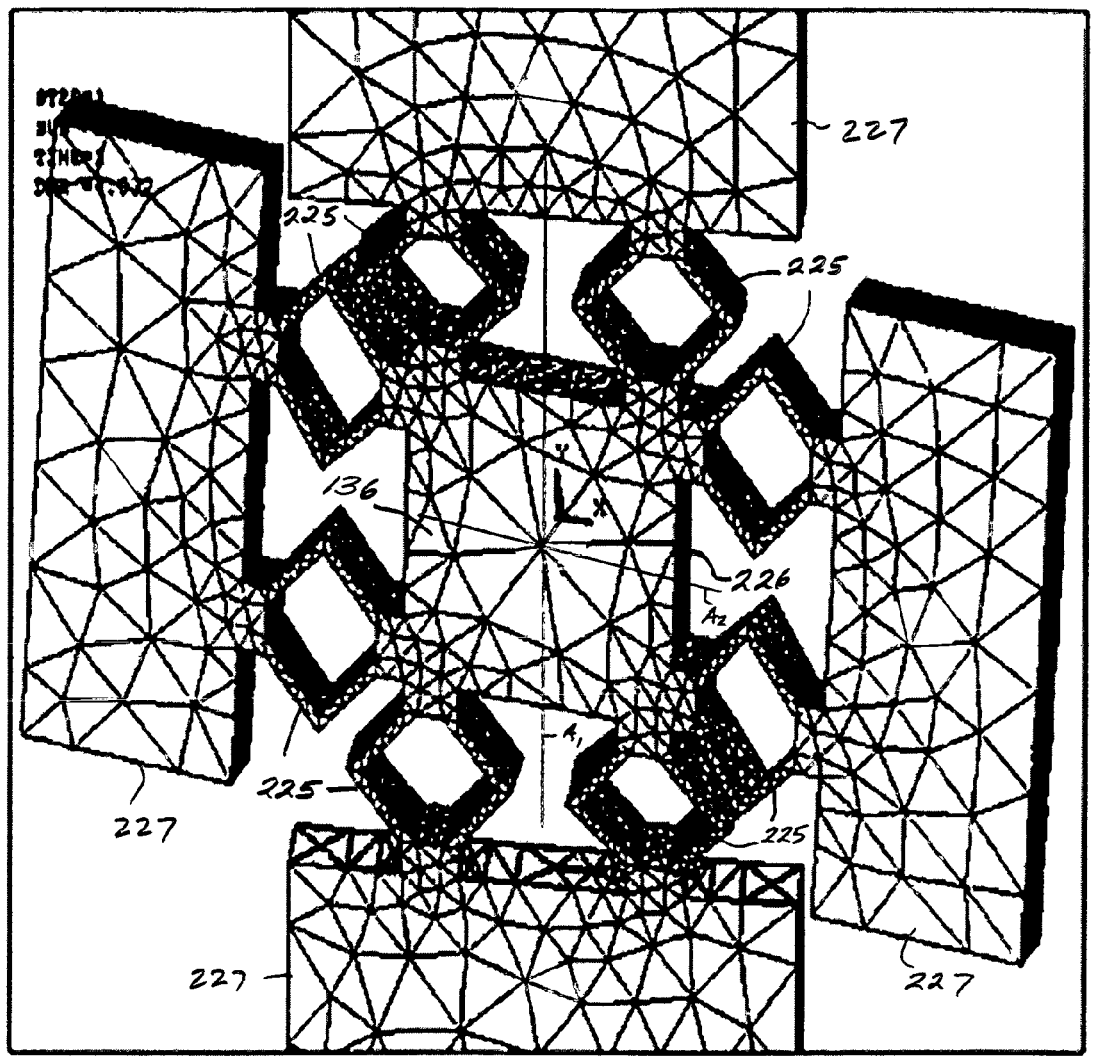
FIG. 4(A) is a perspective finite-element-analysis diagram of an exemplary configuration of the mirror-platform region in which linkages coupled from actuators to the mirror comprise widely separated flexures.

FIG. 4(A) depicts a square reflective element 136 mounted on a correspondingly shaped support platform 226. The depiction is in a form suitable for finite-element analysis (FEA) of the mechanism. The support platform 226 is supported by linkages 225 on each corner of the platform 226. The linkages 225 are widely separated from each other with respect to each tilt axis $A_1$, $A_2$ and represent respective linkages to respective galvanometers (not shown). In this embodiment, the linkages 225 can be contiguous with the support platform 226 (e.g., the support platform 226 and linkages 225 can be made from a single wafer of silicon or a suitable metal). The ends of the respective galvanometer shafts coupled to the linkages 225 are represented by rectangular blocks 227. Splitting the linkages 225 in each tilt direction into two components as shown and spacing them as far apart as possible (within the dimensions of the support platform 226), improves the transfer of rotational energy from the galvanometer shafts 227 to the support platform 226 without significantly sacrificing linkage compliance to allow movements in the orthogonal axis.

Figure 4B:
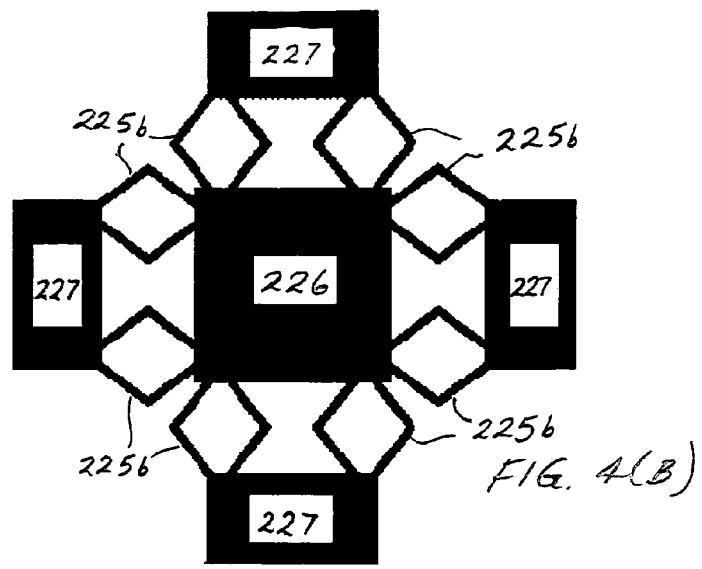
FIGS. 4(B)-4(D) depict alternative shapes for the flexures in the linkages.
Figure 4C:
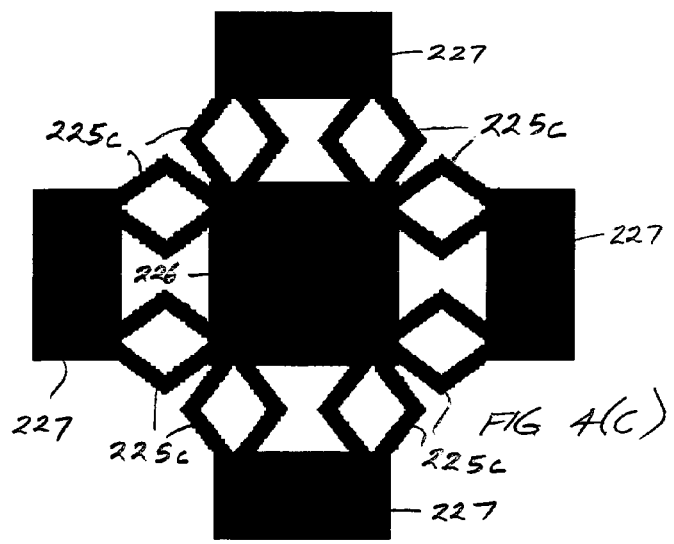
Figure 4D:
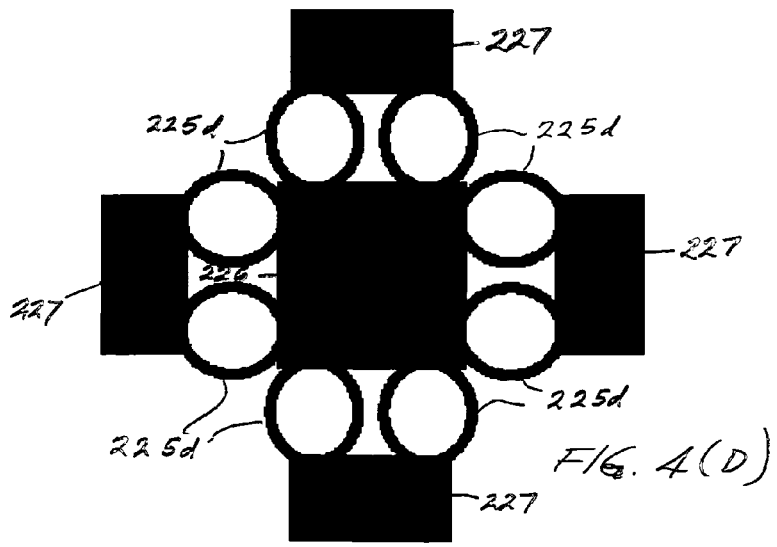

FIGS. 4(B)-4(D) are respective plan views showing, with respect to the configuration shown in FIG. 4(A), alternative configurations of linkages. FIG. 4(B) depicts the support platform 226 coupled by a total of eight flexures 225b to four galvanometer shafts 227. By utilizing two galvanometer attachments in each of the x- and y-dimensions, wherein the attachments are displaced from the respective centers of rotation, a more efficient translation of rotational torque is achieved, while allowing for sufficient flex in each direction. Also, increased mechanical stability is realized (i.e., reduced flex) of the support platform 226 with the increased number of attachments. FIG. 4(C) shows a configuration similar to FIG. 4(B), except that both the thickness and the length-to-width ratio of the flexures 225c are different than in FIG. 4(B). These variables can be varied to affect stiffness in any of various desired directions. FIG. 4(D) shows that the flexures 225d can have any of various geometric configurations. The substantially elliptical shape of the flexures 225d reduces concentrations of stress that otherwise would be present near sharp angles.

Figure 5:
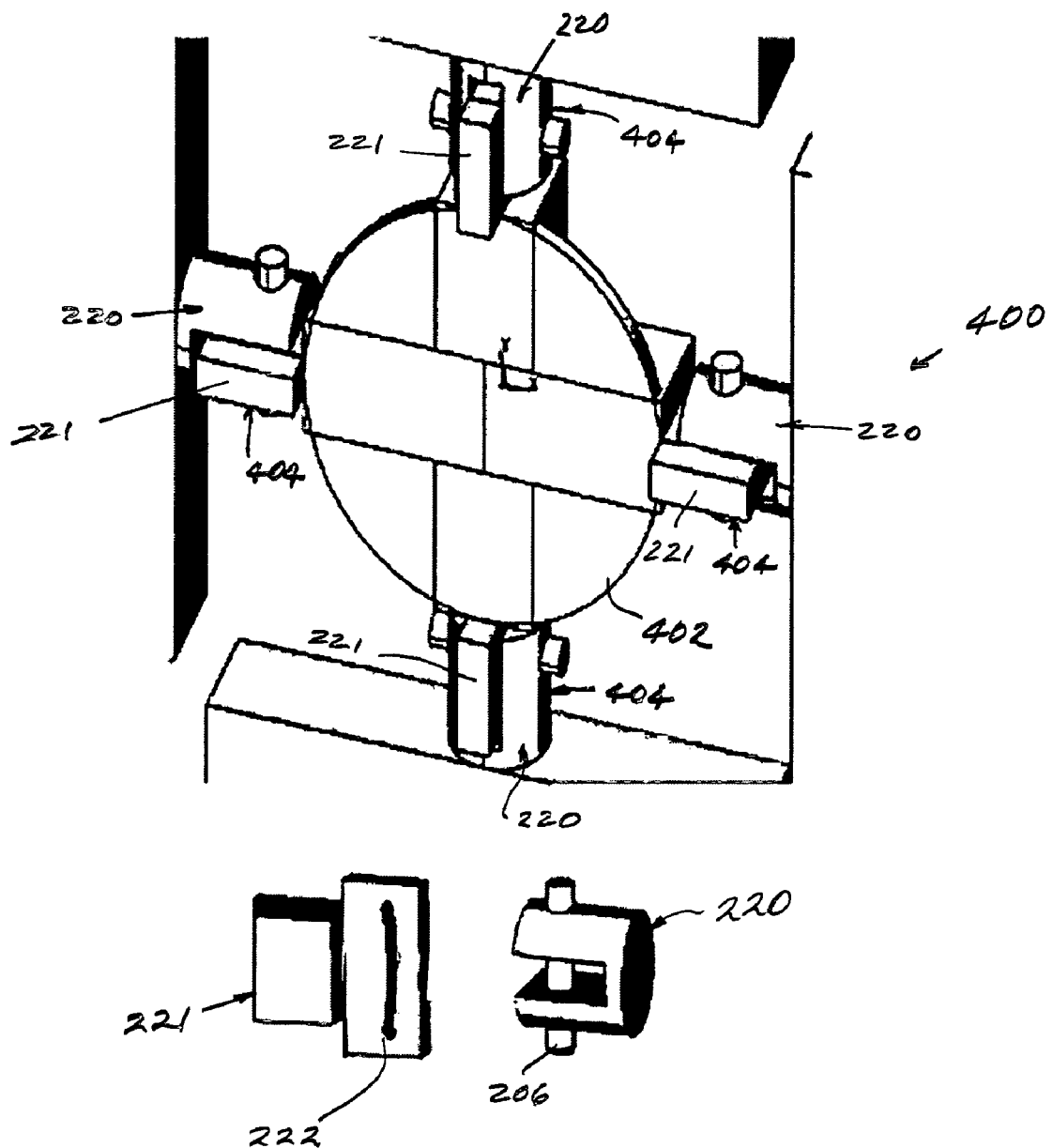
FIG. 5 is a perspective view of an embodiment of the mirror-platform region comprising in which four slip-joint linkages with internal pins.

Another representative embodiment 400 of a support platform 402, for supporting a reflective element, and linkages 404 coupled to the platform is illustrated in FIG. 5. In the embodiments described above, most of the tilt energy imparted by the galvanometers to the platform is converted to potential energy stored by deformations of the linkages. But, care must be taken so as not to cause permanent deformation (e.g., breakage) of the linkages. The amount of potential energy absorbed by the system can be described in terms of the degree of deformation and the spring constants of the flexures of the linkages that couple the galvanometers to the platform. Generation of potential energy (i.e., energy generated by the galvanometers) can be substantially reduced by allowing linkage surfaces to move relative to one another. Assuming low frictional losses, such a configuration can, at least under some conditions, produce more rapid movements of the platform for a given input power. A possible disadvantage of this approach is the possibility of imparting detrimental wear on the moving surfaces during prolonged use.

In the embodiment 400 of FIG. 5, tilt commands are transferred in the x- and y-axes while simultaneously allowing tilt motions in both axes. In this embodiment the rotational shaft of each of four galvanometers (not shown but arranged as shown in FIG. 3(A)) has a respective "U-shaped" end 220 configured to accept an insert 221 coupled to the support platform 402. Each insert 221 includes a respective pin 206 that fits through both a hole in the respective end 220 and through a slot 222 in the insert 221. The resulting coupling stabilizes the support platform 402 by limiting unwanted platform movements relative to the shaft of the respective galvanometer. Each U-shaped end 220 transfers rotational energy from the galvanometer shaft to the support platform 402. Collectively, the ends 220 and inserts 221 form respective rotational translators that allow simultaneous rotation of the support platform 402 in the x- and y-axes. The break-out diagrams at the bottom of FIG. 5 show a perspective view of an insert 221, a U-shaped end 220, and a pin 206.

Figure 6A:
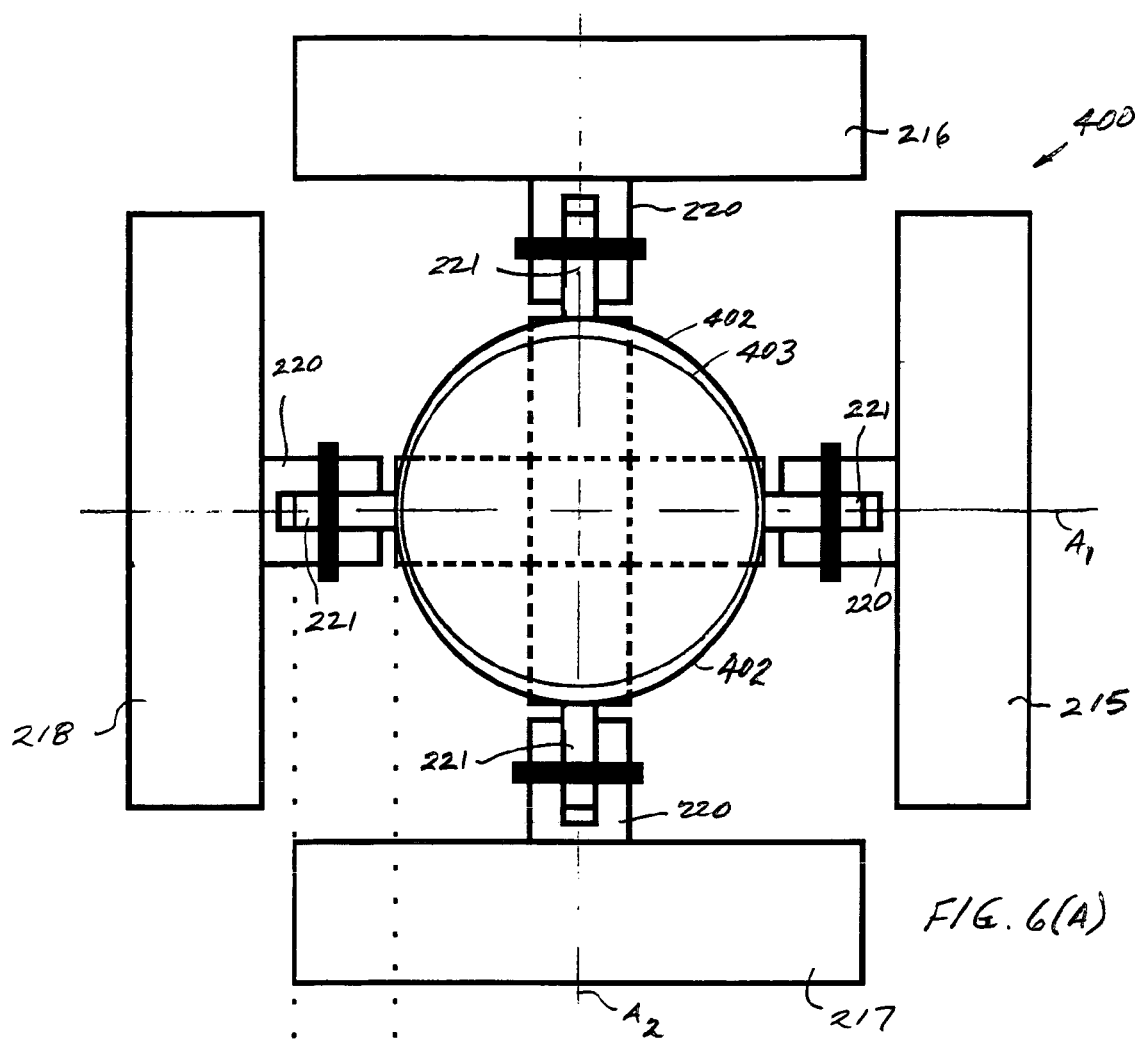
FIG. 6(A) is a schematic plan view of the slip-joint beam-steering structure shown in FIG. 5.
Figure 6B:
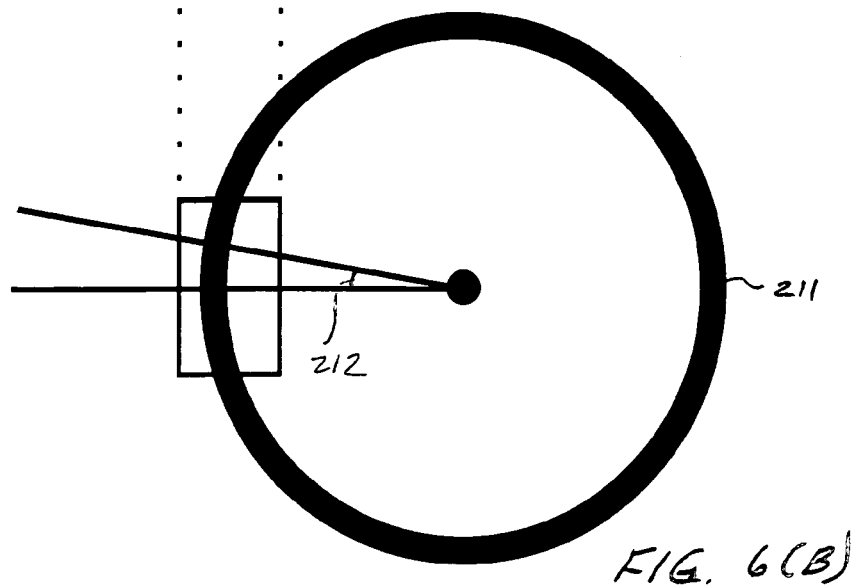
FIG. 6(B) schematically depicts an exemplary method by which an appropriate slot can be defined within a platform-linkage insert.

FIG. 6(A) is a schematic plan view of the beam-steering device illustrated in FIG. 5. In FIG. 6(A), the galvanometers 215-218 are depicted as respective rectangular blocks. The galvanometer 215 (and optionally 218) generates torque for moving the support platform 402 and reflective element 403 about the x-axis, and the galvanometer 216 (and optionally 217) generate torque for moving the support platform 402 and reflective element 403 about the y-axis. The slots 222 (FIG. 5) defined in the inserts 221 desirably have a curvature that is suitable for accommodating corresponding rotational motions of the support platform 402. In FIGS. 6(A)-6(B) the vertical dashed lines that project from the left-most insert to the side-view of the insert shown in FIG. 6(B) indicate an exemplary manner in which the radially curved slot can be formed. The radius of curvature corresponds to the distance from the slot to the center of the support platform 402. The bold circle 211 represents a hypothetical slot that would allow the support platform 402 to rotate completely 360° (mechanical). In practice, the angle 212 that must be accommodated is typically up to +15° (mechanical). The portion of the bold circle 211 within this angular range corresponds to the material that must be removed from the insert to form the slot depicted in the insert 221.

Finite-element analysis can be used to optimize dimensions and select appropriate materials for fabricating the linkages for the size and mass of the support platform and reflective element that is needed for a particular application. FIGS. 4 and 5 were generated, and the motions of the depicted devices were simulated, using ANSYS (Canonsburg, Pa.), an exemplary finite-element-modeling software tool. The linkages, support platform, and other components of the beam-steering device can be constructed from silicon using well-established, silicon-on-insulator (SOI) fabrication techniques. Alternatively, components can be created using micromachining techniques such as those similar to methods employed in the fabrication of parts for watches. Mirrored surfaces of reflective elements can be fabricated from a single crystalline silicon substrate or from a polished metal plate. Alternatively, a commercially available conventional thin-metal or dielectric-coated reflector can be attached to the support platform.

Whereas the invention has been described in connection with multiple representative embodiments, it will be understood that the invention is not limited to those embodiments. On the contrary, the invention is intended to encompass all modifications, alternatives, and equivalents as may be included within the spirit and scope of the invention, as defined by the appended claims.

What is claimed is:

1. A two-axis, beam-steering device, comprising:
a support platform having a top surface;
a reflective surface situated on the top surface of the support platform;
a first galvanometer having a first rotational shaft which defines a first fixed rotational axis;
a second galvanometer having a second rotational shaft which defines a second fixed rotational axis oriented substantially orthogonally to the first rotational axis;
a first linkage extending along the first rotational axis and coupling the first galvanometer to the support platform; and
a second linkage extending along the second rotational axis and coupling the second galvanometer to the support platform, the first galvanometer being situated relative to the support platform so as to rotate the support platform about the first rotational axis, and the second galvanometer being situated relative to the support platform so as to rotate the support platform about the second rotational axis, thereby providing simultaneous rotation of the support platform about the first and second rotational axes as the reflective surface reflects a beam of electromagnetic energy incident to the reflective surface.

2. The beam-steering device of claim 1, wherein:
the reflective surface has a center; and
the first and second rotational axes intersect at the center.

3. The beam-steering device of claim 1, further comprising a position sensor situated and configured to determine a position of the reflective surface relative to a fixed reference.

4. The beam-steering device of claim 3, wherein the position sensor is situated and configured to determine the position of the reflective surface relative to the fixed reference comprising the first and second rotational axes.

5. The beam-steering device of claim 3, wherein the position sensor comprises:
a first rotational-position sensor situated and configured to determine a rotational position of the first linkage about the first rotational axis; and
a second rotational-position sensor situated and configured to determine a rotational position of the second linkage about the second rotational axis.

6. The beam-steering device of claim 5, wherein the first and second rotational position sensors produce respective positional feedback data from which a position of the reflective surface is determined.

7. The beam-steering device of claim 3, wherein the position sensor comprises an optical detector situated and configured to detect electromagnetic radiation reflected from the reflective surface, to produce corresponding light-position data, and to correlate the light-position data with a corresponding position of the reflective element.

8. The beam-steering device of claim 3, wherein the position sensor comprises a capacitance detector situated and configured to obtain data regarding electrical capacitance between the support platform and the fixed reference.

9. The beam-steering device of claim 8, wherein the capacitance detector comprises at least one electrostatically charged silicon comb situated between the support platform and the fixed reference.

10. The beam-steering device of claim 1, further comprising:
a first passive linkage extending along the first rotational axis and coupling the support platform, on a side of the support platform opposite the first linkage, in a pivotable manner to a fixed support; and
a second passive linkage extending along the second rotational axis and coupling the support platform, on a side of the support platform opposite the second linkage, in a pivotable manner to the fixed support.

11. The beam-steering device of claim 1, further comprising:
a third galvanometer situated on the first fixed rotational axis but on a side of the support platform opposite the first linkage;
a third linkage extending along the first rotational axis but on a side of the support platform opposite the first linkage, the third linkage coupling the third galvanometer to the support platform;
a fourth galvanometer situated on the second fixed rotational axis but on a side of the support platform opposite the second linkage; and
a fourth linkage extending along the second rotational axis but on a side of the support platform opposite the second linkage, the fourth linkage coupling the fourth galvanometer to the support platform.

12. The beam-steering device of claim 11, wherein:
the first galvanometer is wired for rotation, when electrically energized, in a first rotational direction;
the third galvanometer is wired for rotation, when electrically energized, in a third rotational direction that is opposite the first rotational direction;
the second galvanometer is wired for rotation, when electrically energized, in a second rotational direction; and
the fourth galvanometer is wired for rotation, when electrically energized, in a fourth rotational direction that is opposite the second rotational direction.

13. The beam-steering device of claim 1, further comprising a heat-sink in thermal contact with the first and second galvanometers to conduct heat from the first and second galvanometer.

14. The beam-steering device of claim 1, wherein:
the first linkage comprises a first section and a first compressible member located between the first linkage and the support platform, the first compressible member being configured to provide a variable length of the first section and the first compressible member; and
the second linkage comprises a second section and a second compressible member located between the second linkage and the support platform, the second compressible member being configured to provide a variable length of the second section and the second compressible member.

15. The beam-steering device of claim 14, wherein:
the first linkage is substantially non-compliant in rotation about the second rotational axis and has a variable length to permit rotation of the support platform about the first rotational axis; and
the second linkage is substantially non-compliant in rotation about the first rotational axis and has a variable length to permit rotation of the support platform about the second rotational axis.

16. The beam-steering device of claim 1, wherein:
the support platform comprises first and second inserts coupled to the support platform, the first insert extending along the first rotational axis, and the second insert extending along the second rotational axis;
the first linkage comprises a first connecting interface configured for receiving the first insert; and
the second linkage comprises a second connecting interface configured for receiving the second insert.

17. The beam-steering device of claim 16, further comprising:
a first pin configured to secure the first insert to the first connecting interface, the first pin extending, substantially perpendicularly to the first rotational axis, through a slot in the first insert and affixed to the first connecting interface; and
a second pin configured to secure the second insert to the second connecting interface, the second pin extending, substantially perpendicularly to the second rotational axis, through a slot in the second insert and affixed to the second connecting interface;
wherein each slot is curved in a manner allowing the respective pin to engage the respective insert at any of various positions in an angular range within the curved slot.

18. The beam-steering device of claim 1, wherein the reflective surface is of a reflective element mounted to the support platform.

19. The beam-steering device of claim 1, wherein the support platform is rotatable by the galvanometers over a total mechanical angle of at least four degrees about each of the rotational axes.

20. The beam-steering device of claim 1, wherein the support platform is rotatable by the galvanometers at a frequency of at least 1.5 kHz.

21. The beam-steering device of claim 1, further comprising:
a first flexure mounted to the first linkage between the support platform and the first galvanometer; and
a second flexure mounted to the second linkage between the support platform and the second galvanometer.

* * * * *

UNITED STATES PATENT AND TRADEMARK OFFICE
CERTIFICATE OF CORRECTION

PATENT NO. : 7,796,314 B2
APPLICATION NO. : 10/592035
DATED : September 14, 2010
INVENTOR(S) : Sutko et al.

Page 1 of 1

It is certified that error appears in the above-identified patent and that said Letters Patent is hereby corrected as shown below:

On the Title page item [54] & Column 1, line 1:
In the title, please replace "Method and" with --Methods and...--.

At column 1, line 1, please replace "Method and..." with --Methods and--.
At column 1, line 3, after the title, there should be inserted:
--Statement of Government Support
The present invention was made with United States Government support under Grant No. EPS0132556, awarded by the National Science Foundation. The United States Government has certain rights in the invention.--.

At column 4, line 32, please replace "comprising in which four" with --comprising four--.
At column 4, line 54, please replace "of > 1.5 kHz" with --of $\geq$ 1.5kHz--.
At column 9, line 49, please replace "+ 15°" with -- $\pm$ 15°--.
At column 11, lines 44-45, please replace "galvanometer" with --galvanometers--.
At column 5, line 25, please replace "and an outlet 10, and an outlet 109" with --and an outlet 109--.

Signed and Sealed this
Seventh Day of June, 2011

David J. Kappos
*Director of the United States Patent and Trademark Office*